US011307801B2

(12) United States Patent
Li et al.

(10) Patent No.: US 11,307,801 B2
(45) Date of Patent: Apr. 19, 2022

(54) METHOD, APPARATUS, DEVICE AND STORAGE MEDIUM FOR PROCESSING ACCESS REQUEST

(71) Applicant: Beijing Baidu Netcom Science and Technology Co., Ltd., Beijing (CN)

(72) Inventors: Lin Li, Beijing (CN); Yu Zhang, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 0 days.

(21) Appl. No.: 16/707,465

(22) Filed: Dec. 9, 2019

(65) Prior Publication Data

US 2020/0371714 A1    Nov. 26, 2020

(30) Foreign Application Priority Data

May 24, 2019  (CN) .......................... 201910438452.0

(51) Int. Cl.
*G06F 3/06* (2006.01)
*G06F 11/07* (2006.01)

(52) U.S. Cl.
CPC .......... *G06F 3/0659* (2013.01); *G06F 3/0604* (2013.01); *G06F 3/067* (2013.01);
(Continued)

(58) Field of Classification Search
CPC .... G06F 3/0659; G06F 3/0604; G06F 3/0622; G06F 3/067; G06F 11/0757; G06F 11/076
(Continued)

(56) References Cited

U.S. PATENT DOCUMENTS 6,667,926 B1 * 12/2003 Chen .................... G06F 13/161
                                                      365/221
7,610,443 B2    10/2009 Huang
(Continued)

FOREIGN PATENT DOCUMENTS

CN    103631624 A    3/2014
CN    105933325 A    9/2016
(Continued)

OTHER PUBLICATIONS

Tao, L. (2015). "Parallel program scheduling optimization system under heterogeneous memory environment", Master's Thesis.
(Continued)

*Primary Examiner* — Christopher B Shin
(74) *Attorney, Agent, or Firm* — The Webb Law Firm

(57) ABSTRACT

Embodiments of the present disclosure provide a method, apparatus, device, and storage medium for processing an access request, and relate to the field of cloud computing. The method includes: acquiring a plurality of to-be-distributed access requests for a storage device, the access requests at least including a group of read requests and a group of write requests; distributing read requests of the group of read requests to a drive device of the storage device without distributing a write request of the group of write requests, until a number of distributed read requests reaches a total number of read requests of the group of read requests or a first threshold number, the drive device being configured to execute the distributed requests on the storage device; and distributing at least one write request of the group of write requests to the drive device.

17 Claims, 5 Drawing Sheets

(52) U.S. Cl.
CPC ......... *G06F 3/0622* (2013.01); *G06F 11/076* (2013.01); *G06F 11/0757* (2013.01)

(58) Field of Classification Search
USPC .......................................................... 711/154
See application file for complete search history.

(56) References Cited

U.S. PATENT DOCUMENTS

| | | | | |
|---|---|---|---|---|
| 9,465,555 | B2* | 10/2016 | Barrell | G06F 3/0659 |
| 9,552,297 | B2* | 1/2017 | Traut | G06F 12/0866 |
| 9,696,911 | B2* | 7/2017 | Kim | G06F 3/0688 |
| 10,372,377 | B2* | 8/2019 | Iwai | G06F 3/0679 |
| 10,430,113 | B2* | 10/2019 | Ikarashi | G06F 12/06 |
| 2002/0131345 | A1 | 9/2002 | Turner et al. | |
| 2002/0169947 | A1 | 11/2002 | Bilardi et al. | |
| 2003/0120884 | A1* | 6/2003 | Koob | G06F 5/065 |
| | | | | 711/170 |
| 2005/0172084 | A1* | 8/2005 | Jeddeloh | G06F 3/0656 |
| | | | | 711/154 |
| 2009/0019238 | A1* | 1/2009 | Allison | G06F 13/1642 |
| | | | | 711/151 |
| 2011/0026318 | A1* | 2/2011 | Franceschini | G06F 13/161 |
| | | | | 365/163 |
| 2014/0204684 | A1 | 7/2014 | Kwak et al. | |
| 2015/0006762 | A1* | 1/2015 | Lee | G06F 13/1673 |
| | | | | 710/5 |
| 2016/0224247 | A1 | 8/2016 | Woo et al. | |
| 2016/0246717 | A1 | 8/2016 | Patil et al. | |
| 2016/0254038 | A1 | 9/2016 | Kwak et al. | |
| 2017/0357466 | A1 | 12/2017 | Byun | |
| 2018/0232178 | A1 | 8/2018 | Iwaki et al. | |
| 2019/0057049 | A1 | 2/2019 | Koo et al. | |
| 2020/0051627 | A1* | 2/2020 | Hong | G11C 29/42 |
| 2021/0042233 | A1* | 2/2021 | Lee | G06F 3/0659 |

FOREIGN PATENT DOCUMENTS

| | | |
|---|---|---|
| CN | 108062253 A | 5/2018 |
| CN | 109522194 A | 3/2019 |
| CN | 109766056 A | 5/2019 |
| JP | 2004527054 A | 9/2004 |
| JP | 2006244455 A | 9/2006 |
| JP | 2014137841 A | 7/2014 |
| JP | 201754483 A | 3/2017 |
| KR | 1020160094765 A | 8/2016 |
| KR | 1020170141298 A | 12/2017 |
| KR | 1020190019712 A | 2/2019 |

OTHER PUBLICATIONS

Wang et al., "A Novel I/O Scheduler for SSD with Improved Performance and Lifetime", 2013 IEEE 29th Symposium on Mass Storage Systems and Technologies (MSST), 2013, pp. 1-7.

* cited by examiner

METHOD, APPARATUS, DEVICE AND STORAGE MEDIUM FOR PROCESSING ACCESS REQUEST

CROSS-REFERENCE TO RELATED APPLICATION

This application claims priority to Chinese Patent Application No. 201910438452.0 filed May 24, 2019, the disclosure of which is hereby incorporated by reference in its entirety.

TECHNICAL FIELD

Embodiments of the present disclosure mainly relate to the field of computer storage, and more particularly to a method, apparatus, device, and computer readable storage medium for processing an access request.

BACKGROUND

With the development of computer technology, at present, the high-speed storage device with a higher hardware access speed has emerged. Whist improving the hardware speed, the driver of the storage device is also required to be modified accordingly, to utilize the potential of the high-speed storage device to the maximum extent. In this case, how to manage access to the high-speed storage device by a more efficient approach has become a technical problem.

SUMMARY

According to example embodiments of the present disclosure, a scheme for processing an access request is provided.

In a first aspect of the present disclosure, a method for processing an access request is provided. The method includes acquiring a plurality of to-be-distributed access requests for a storage device, the access requests at least comprising a group of read requests and a group of write requests; distributing read requests of the group of read requests to a drive device of the storage device without distributing a write request of the group of write requests, until a number of distributed read requests reaches a total number of read requests of the group of read requests or a first threshold number, the drive device being configured to execute the distributed requests on the storage device; and distributing at least one write request of the group of write requests to the drive device.

In a second aspect of the present disclosure, an apparatus for processing an access request is provided. The apparatus includes an acquiring module configured to acquire a plurality of to-be-distributed access requests for a storage device, the access requests at least comprising a group of read requests and a group of write requests; a first distributing module configured to distribute read requests of the group of read requests to a drive device of the storage device without distributing a write request of the group of write requests, until a number of distributed read requests reaches a total number of read requests of the group of read requests or a first threshold number, the drive device being configured to execute the distributed requests on the storage device; and a second distributing module configured to distribute at least one write request of the group of write requests to the drive device.

In a third aspect of the present disclosure, an electronic device is provided, including one or more processors; and a storage apparatus for storing one or more programs, when executed by the one or more processors, cause the one or more processors to implement the method according to the first aspect of the disclosure.

In a fourth aspect of the present disclosure, a computer readable storage medium is provided, storing a computer program thereon, where the program, when executed by a processor, implements the method according to the first aspect of the disclosure.

It should be understood that the content described in the summary section of the disclosure is not intended to limit the key or important features of the embodiments of the present disclosure, nor is it intended to limit the scope of the present disclosure. Other features of the present disclosure will become easily understood by the following description.

BRIEF DESCRIPTION OF THE DRAWINGS

In conjunction with the accompanying drawings and with reference to detailed descriptions below, the above and other features, advantages, and aspects of various embodiments of the present disclosure will become more apparent. Identical or similar reference numerals in the accompanying drawings represent identical or similar elements.

DETAILED DESCRIPTION OF EMBODIMENTS

Figure 1:
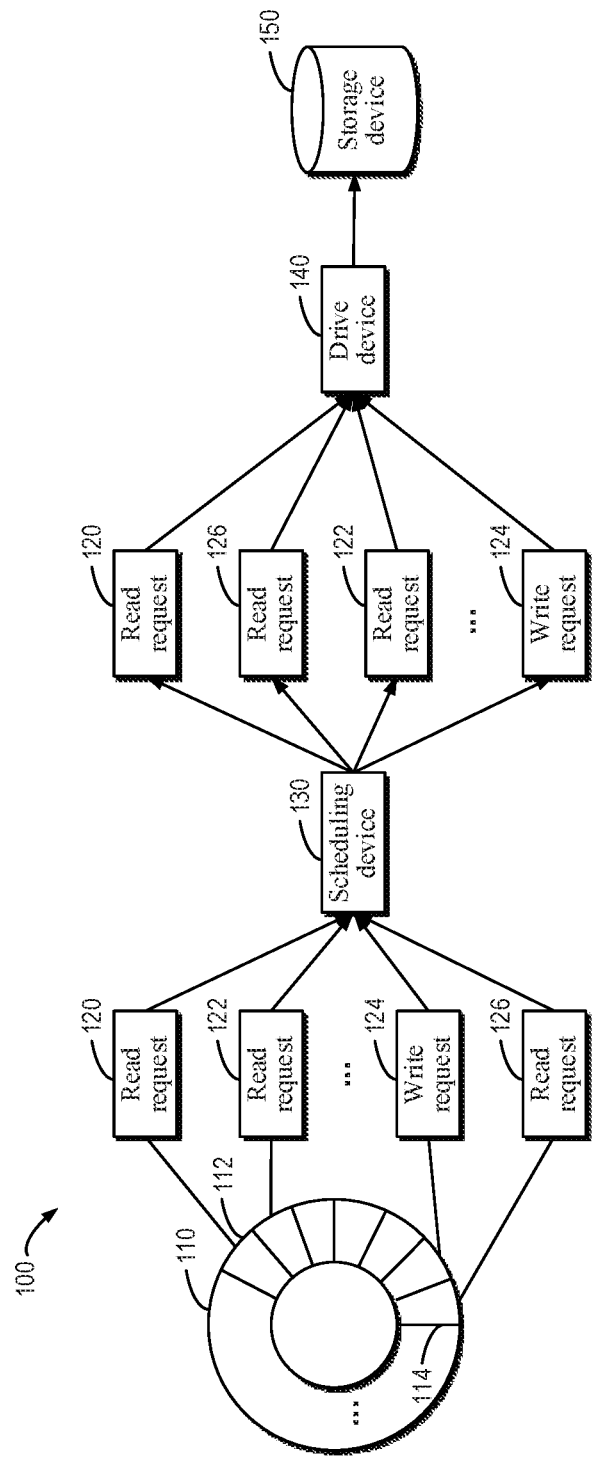
FIG. 1 shows a schematic diagram of an example environment in which a plurality of embodiments of the present disclosure can be implemented.

Embodiments of the present disclosure will be described in more detail below with reference to the accompanying drawings. Some embodiments of the present disclosure are shown in the accompanying drawings. However, it should be understood that the present disclosure may be implemented by various approaches, and should not be construed as being limited to the embodiments set forth herein. On the contrary, these embodiments are provided to more thoroughly and completely understand the present disclosure. It should be understood that the accompanying drawings and embodiments of the present disclosure merely play an exemplary role, and are not intended to limit the scope of protection of the present disclosure.

In the description of the embodiments of the present disclosure, the term "including" and similar wordings thereof should be construed as open-ended inclusions, i.e., "including but not limited to." The term "based on" should be construed as "at least partially based on." The term "an embodiment" or "the embodiment" should be construed as "at least one embodiment." The terms, such as "first," and "second," may refer to different or identical objects. Other explicit and implicit definitions may be further included below.

With the development of hardware technology of storage devices, high-speed storage devices have been developed, and the high-speed storage devices occupy an increasing proportion in the data center. Compared with conventional low-speed storage devices, the high-speed storage devices have very high data access speed and low access delay. For example, NVMe SSD is thousands of times faster than a conventional SAS or SATA Winchester disk, and 5 to 10 times faster than earlier SATA SSD.

The performance and efficiency of a traditional driver implemented in a kernel mode is difficult to give play to the advantages of the high-speed devices. In order to improve the response efficiency of the storage devices, at present, a technical scheme of migrating drivers of the storage devices from a kernel mode to a user mode has been presented. In this way, kernel context switching can be avoided, thereby reducing burdens of the central processing unit (CPU), and allowing the CPU to use more instruction cycles in actual data processing and storage.

However, during implementing access to the storage devices in the user mode, access requests for the storage devices are processed by polling, and the access requests are quickly distributed, thereby reducing waiting duration and reducing delay. However, at present, the user-mode driver can only simply distribute to-be-executed access requests in sequence, fails to adjust the distribution sequence of the access requests, and then can hardly improve the execution performance of the access requests.

According to an embodiment of the present disclosure, a scheme of processing an access request is presented. The scheme includes: acquiring a plurality of access requests for a storage device, the access requests at least including a group of read requests and a group of write requests; then distributing read requests of the group of read requests to a drive device of the storage device without distributing a write request of the group of write requests, until a number of distributed read requests reaches a total number of read requests of the group of read requests or a first threshold number, the drive device being configured to execute the distributed requests on the storage device; and then distributing at least one write request of the group of write requests to the drive device. The scheme of some embodiments of the present disclosure can preferentially distribute read requests of the access requests, thereby faster providing desired data of a user, and then improving the execution efficiency of the access requests.

According to example implementations of the present disclosure, running the scheduling codes of the access requests in the user mode means that the driver does not run in the kernel mode, which can avoid the kernel context switching and interrupt, saves a lot of processing costs of the CPU, and allows the CPU to execute actual data storage in more clock cycles.

Figure 2:
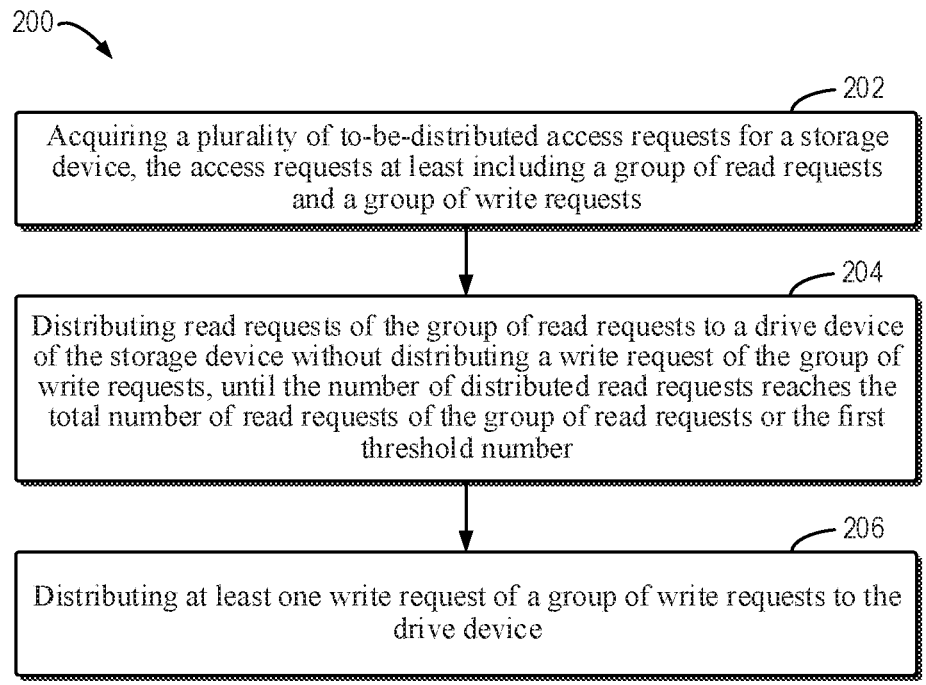
FIG. 2 shows a flowchart of a process of processing an access request according to an embodiment of the present disclosure.

Embodiments of the present disclosure will be specifically described below with reference to the accompanying drawings. FIG. 1 shows a schematic diagram of an example environment 100 in which a plurality of embodiments of the present disclosure can be implemented. As shown in FIG. 2, the example environment 100 includes a scheduling device 130, a drive device 140, and a storage device 150, where the scheduling device 130 can receive a group of access requests. The group of access requests specifically includes a plurality of read requests 120, 122, and 126, and a write request 124.

In some embodiments, the scheduling device 130 may acquire a group of access requests from a circular linked list storing access requests for access to the storage device 150. As show in FIG. 2, the circular linked list 110 may store a plurality of received access requests for access to the storage device 150. The circular linked list 110 may include: a head pointer 112 for pointing to a first access request of to-be-processed access requests; and a tail pointer 114 for pointing to a last access request of the to-be-processed access requests.

In some embodiments, the scheduling device 130 may select a group of access requests from the circular linked list 110 at a preset time interval. It can be understood that if each time an access request is received, access to data specified by the access request in the storage device 150 is executed, too frequent accesses to the storage device 150 are caused. In particular, when a small amount of data is involved in the access requests, frequently executing the access request for the storage device 150 results in reduced overall performance of the storage system. In the present disclosure, a length of the preset time interval may be specified. In this way, centralized processing of the plurality of access requests received within the preset time interval may be performed, to improve the overall performance of the access operation.

In some embodiments, the number of access requests of a group of access requests is not greater than a threshold number. The threshold number may be set to a preset number, e.g., 32, 16, or 8. For example, the number may be determined based on the frequency or number of receiving the access requests, or based on the requirements of the storage system for response time.

As shown in FIG. 2, the scheduling device 130 can distribute the group of received access requests (the read requests 120, 122, and 126 and the write request 124) to the user-mode drive device (also referred to as a user-mode driver) to execute a restructuring access request on the storage device 150.

The scheduling device 130 can further adjust a sequence of distributing access requests of the group of received access requests. Specifically, considering that when sending a read request, the application 130 always expects to timely obtain data for the read request, while the application 130 only needs the data to be written correctly when sending a write request. Thus, the scheduling device 130 can adjust a distribution sequence of the group of received access requests, such that the read request can be preferentially distributed. Further, considering that it is necessary to ensure that the write request can be executed within a certain period, the scheduling device 130 may also start to distribute the write request after distributing a specific number of read requests, thereby not only ensuring that the read requests are preferentially executed to improve the system efficiency, but also ensuring that the write request can be executed within acceptable time period.

A process of processing an access request will be described in more detail below with reference to FIG. 2 to FIG. 7. FIG. 2 shows a flowchart of a process 200 of processing an access request according to some embodiments of the present disclosure. The process 200 may be implemented by the scheduling device 130 of FIG. 1. To facilitate discussion, the process 200 will be described in conjunction with FIG. 1.

In block 202, the scheduling device 130 acquires a plurality of to-be-distributed access requests for a storage device 150, the access requests at least including a group of read requests and a group of write requests. Specifically, the scheduling device 130 may acquire a group of access requests (e.g., the read requests 120, 122, and 126, and the write request 124) from a to-be-distributed access request queue (e.g., the circular list 110).

In some embodiments, the scheduling device 130 may group access requests into a group of read requests and a group of write requests based on types of the access requests. Additionally, the scheduling device 130 may set a read request queue and a write request queue in a storage space of a user mode (e.g., a storage stack) for storing a group of received read requests and a group of received write requests. The scheduling device 130 may add an access request to a corresponding read request queue or write request queue based on a type of the access request.

In some embodiments, the scheduling device 130 may preferentially distribute a timeout access request to the drive device 140. Specifically, FIG. 3 shows a flowchart of a process 300 of distributing a timeout access request according to an embodiment of the present disclosure.

Figure 3:
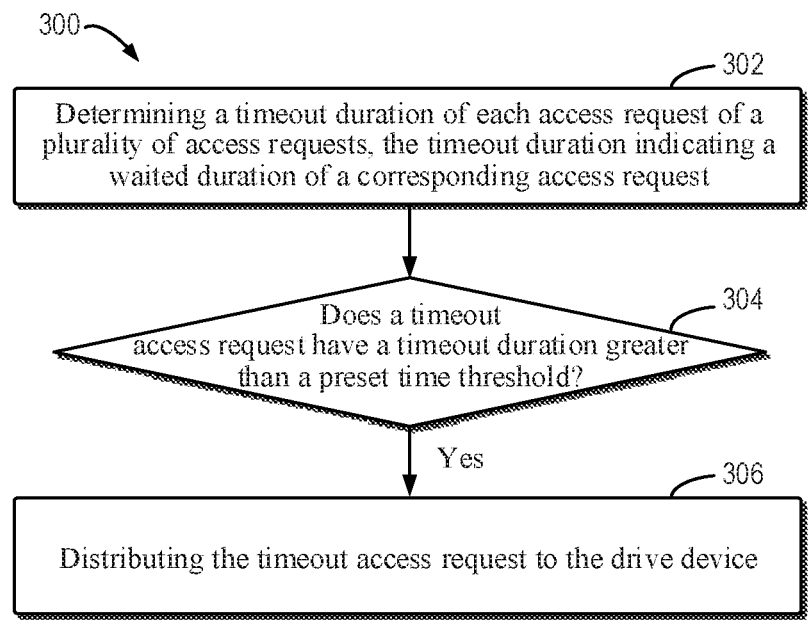
FIG. 3 shows a flowchart of a process of distributing a timeout access request according to an embodiment of the present disclosure.

As shown in FIG. 3, in block 302, the scheduling device 130 may determine a timeout duration of each access request of a plurality of access requests, the timeout duration indicating a waited duration of a corresponding access request. In some embodiments, the computing system 110 may record time of submitting each access request, and the scheduling device 130 may determine the timeout duration of each access request based on the submission time and current time.

In block 304, the scheduling device 130 may determine whether a timeout access request of the plurality of access requests has a timeout duration greater than a preset time threshold. For example, the scheduling device 130 may determine whether there is an access request having the timeout duration greater than the preset time threshold by traversing a group of access requests. In some embodiments, the scheduling device 130 may arrange the access requests in a descending order of timeout durations, thereby traversing the access requests in sequence, and terminating the traversing when finding an access request with a timeout duration failing to exceed a threshold duration. In this way, a computing workload required for the traversing may be reduced.

In response to determining an access request having a timeout duration greater than the time threshold in block 304, the method 300 goes to block 306, i.e., the scheduling device 130 may distribute the timeout access request to the drive device 140. In this way, the scheduling device 130 may preferentially distribute the timeout access request to the drive device 140 for execution. When it is determined that there is no timeout access request in block 304 (not shown in the figure), the read requests may be preferentially distributed based on types of the access requests.

Further referring to FIG. 2, in block 204, the scheduling device 130 distributes read requests of the group of read requests to a drive device 140 of the storage device 150 without distributing a write request of the group of write requests, until the number of distributed read requests reaches the total number of read requests of the group of read requests or the first threshold number. The drive device 140 is configured to execute the distributed requests on the storage device 150. In some embodiments, the drive device may be implemented as a user-mode driver in the user mode.

Figure 4:
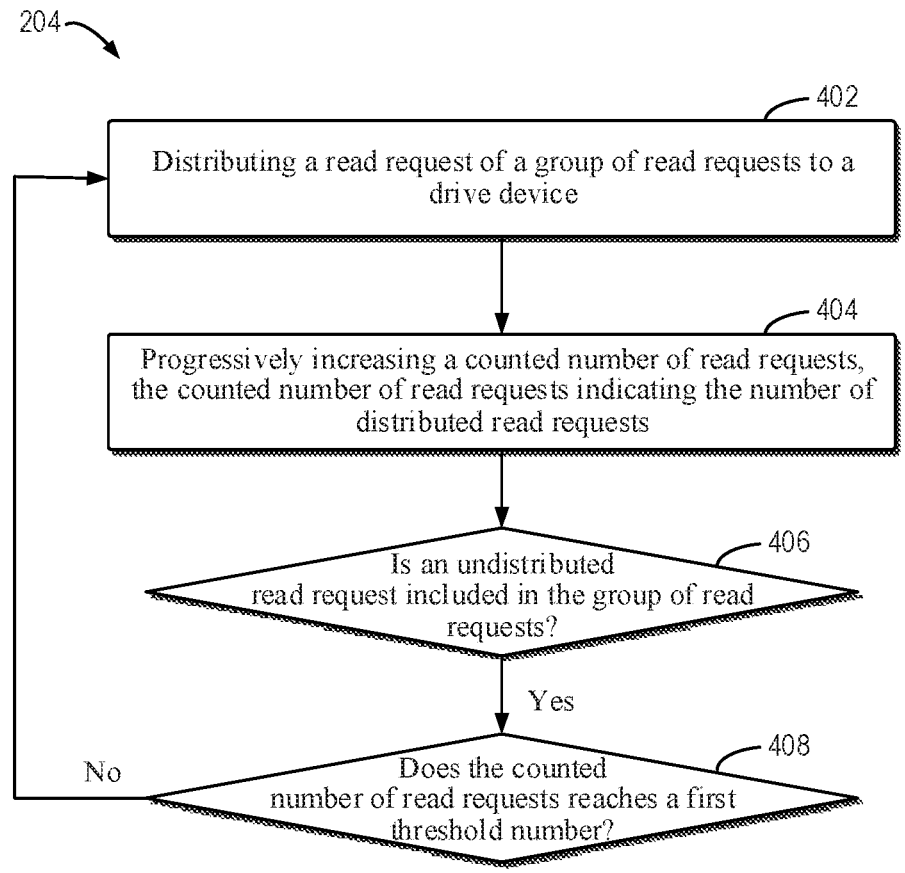
FIG. 4 shows a flowchart of a process of distributing a read request according to an embodiment of the present disclosure.

Specifically, the scheduling device 130 may preferentially distribute a preset number of read requests without distributing a write request, even if the write request may be received earlier. A specific process of the block 204 will be described below with reference to FIG. 4. FIG. 4 shows a flowchart of a process of distributing a read request according to an embodiment of the present disclosure.

Figure 5:
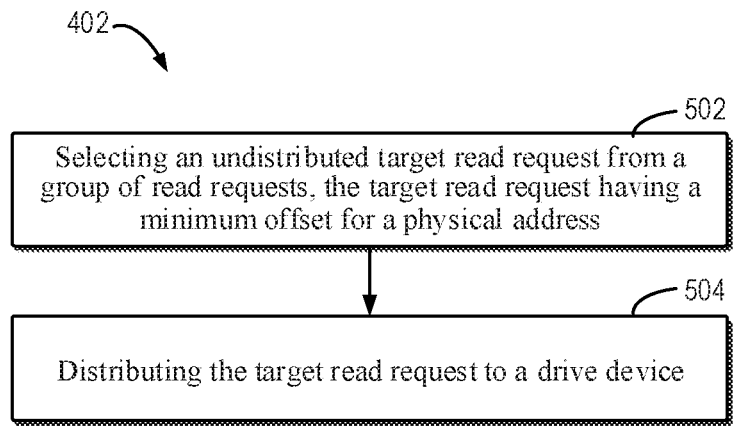
FIG. 5 shows a flowchart of a process of distributing a read request based on an address according to an embodiment of the present disclosure.

As shown in FIG. 4, in block 402, the scheduling device 130 may distribute a read request of a group of read requests to a drive device 140. In some embodiments, the scheduling device 130 may arrange a group of read requests based on physical addresses of the read requests, such that the read requests can be sequentially distributed based on the addresses, thereby improving the execution efficiency of the read requests. Specifically, a process of the block 402 will be described below with reference to FIG. 5. FIG. 5 shows a flowchart of a process of distributing a read request based on an address according to an embodiment of the present disclosure.

As shown in FIG. 5, in block 502, the scheduling device 130 may select an undistributed target read request from a group of read requests, the target read request having a minimum offset for a physical address. In some embodiments, the scheduling device 130 may determine an offset of a physical address of each read request, and e.g., may arrange a group of read requests using a sort tree (e.g., a red-black tree) in sequence of the offsets of the access addresses. For example, the scheduling device 130 may insert a received read request into a sort tree preset in a storage space of a user mode based on an access address of the received read request. Then, the scheduling device 130 may select an undistributed read request with a minimum offset from the sort tree, such that the read requests are always sequentially distributed in sequence of the address offsets of the read requests. For example, when addresses of two read requests are consecutive, such distribution may allow the read requests to be executed without moving a pointer position, thereby improving the efficiency of executing the read requests by the drive device 140. Then, in block 504, the scheduling device 130 may distribute the target read request to a drive device 140.

Further referring to FIG. 4, in block 404, the scheduling device 130 may progressively increase a counted number of read requests, the counted number of read requests indicating the number of distributed read requests. In some embodiments, a scheduling module may maintain counting the read requests to record the number of continuously distributed read requests. For example, the counted number of the read requests may initially be set as 0.

In block 406, the scheduling device 130 determines whether a read request is undistributed in the group of read requests. In response to determining no read request being undistributed in block 506, i.e., completing distributing the group of read requests, the scheduling device 130 may terminate an iteration process.

As shown in FIG. 4, in response to determining the read request being undistributed in block 406, the method may go to block 408, i.e., the scheduling device 130 may determine whether the counted number of the read requests reaches a first threshold number, and when determining the counted number of the read requests reaching the first threshold number, the scheduling device 130 may terminate the iteration process.

On the contrary, when determining the counted number of the read requests failing to reach the first threshold number yet in block 408, the method may return to the block 402, to continue distributing a next read request of the group of read requests. It should be understood that step 402 to step 408 may be iteratively executed until the counted number of the read requests reaches the first threshold number. In this way, the scheduling device 130 may preferentially distribute a preset number of read requests while minimizing impacts on the write request performance, thus improving the overall performance of the storage system.

Further referring to FIG. 2, as shown in FIG. 2, in block 206, the scheduling device 130 may distribute at least one write request of a group of write requests to the drive device 140. In some embodiments, the scheduling device 130 may distribute write requests to the drive device 140 in sequence of receiving the write requests.

Figure 6:
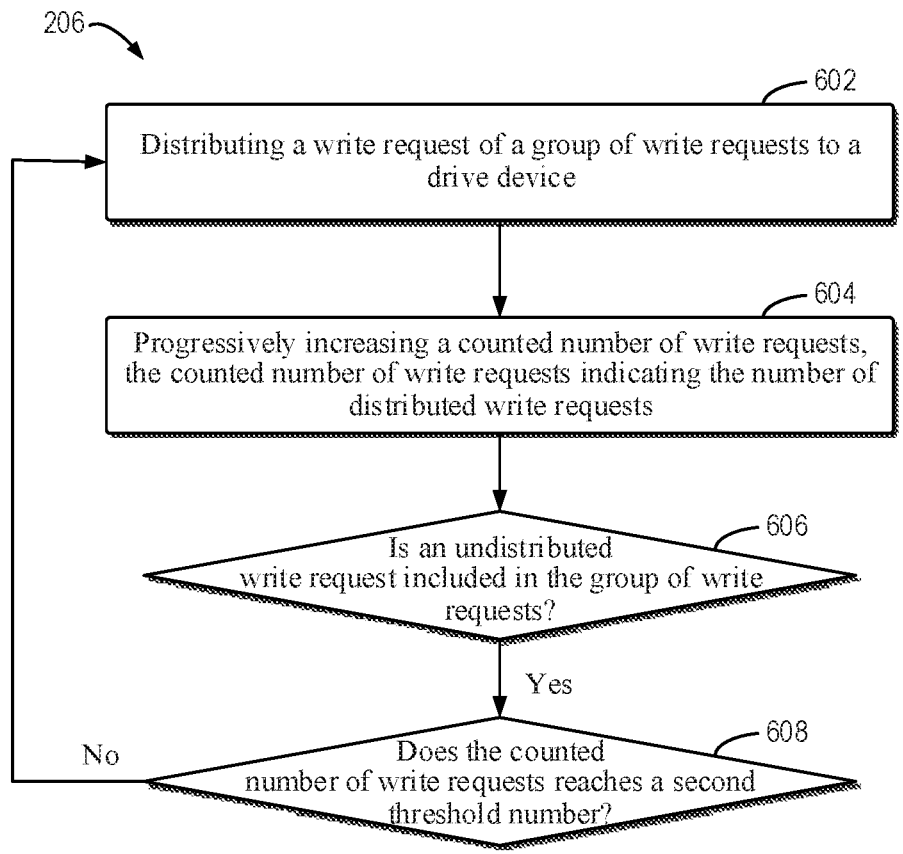
FIG. 6 shows a flowchart of a process of distributing a write request according to an embodiment of the present disclosure.

In some embodiments, similar to processing the group of read requests, the scheduling device 130 may alternatively distribute only at most a preset number of write requests. A process of the block 206 will be described below with reference to FIG. 6. FIG. 6 shows a flowchart of a process of distributing a write request according to an embodiment of the present disclosure.

Figure 7:
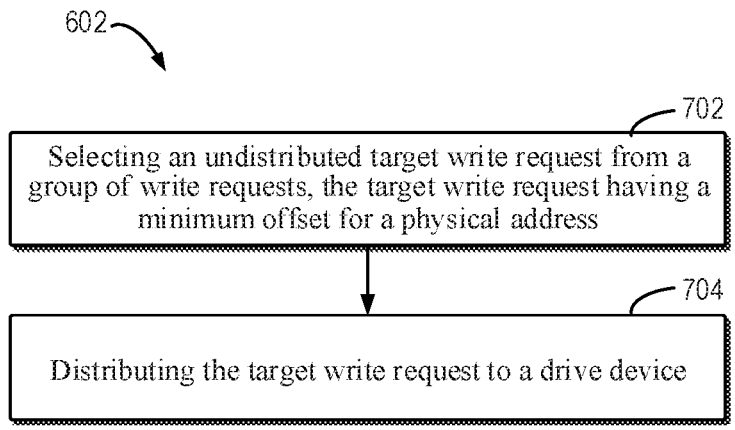
FIG. 7 shows a flowchart of a process of distributing a write request based on an address according to an embodiment of the present disclosure.

As shown in FIG. 6, in block 602, the scheduling device 130 may distribute a write request of a group of write requests to a drive device. In some embodiments, the scheduling device 130 may arrange a group of write requests in an order of physical addresses for the write requests, such that the write requests can be sequentially distributed based on the addresses, thereby improving the execution efficiency of the write requests. Specifically, a process of the block 602 will be described below with reference to FIG. 7. FIG. 7 shows a flowchart of a process of distributing a write request based on an address according to an embodiment of the present disclosure.

As shown in FIG. 7, in block 702, the scheduling device 130 may select an undistributed target write request from a group of write requests, the target write request having a minimum offset for a physical address. In some embodiments, the scheduling device 130 may determine an offset of a physical address of each write request, and e.g., may arrange a group of write requests using a sort tree (e.g., a red-black tree) in sequence of the offsets of the accessed addresses. For example, the scheduling device 130 may insert a received write request into a sort tree preset in a storage space of a user mode based on an access address of the received read request. Then, the scheduling device 130 may select an undistributed write request with a minimum offset from the sort tree, such that the write requests are always sequentially distributed in sequence of the address offsets of the write requests. For example, when addresses of two write requests are consecutive, such distribution may allow the write requests to be executed without moving a pointer position, thereby improving the efficiency of executing the write requests by the drive device 140. Then, in block 704, the scheduling device 130 may distribute the target write request to a drive device 140.

Further referring to FIG. 6, in block 604, the scheduling device 130 may progressively increase a counted number of write requests, the counted number of write requests indicating the number of distributed write requests. In some embodiments, a scheduling module may maintain counting the write request to record the number of continuously distributed write requests. For example, the counted number of write requests may initially be set as 0.

In block 606, the scheduling device 130 may determine whether a write request is undistributed in the group of write requests, and in response to determining the write request still being undistributed in block 606, the method may go to block 608, i.e., the scheduling device 130 may determine whether the counted number of write requests reaches a second threshold number. When determining the counted number of write requests still failing to reach the second threshold number in block 608, the method may return to the block 602, i.e., distributing a next write request of the group of write requests.

When the scheduling device 130 determines each of the group of write requests being distributed or the counted number of write requests reaching the second threshold number, the scheduling device 130 may further process a group of read requests based on the process described in the method 200. It should be understood that step 602 to step 608 may be iteratively executed until the counted number of write requests reaches the first threshold number. In this way, the scheduling device 130 may minimize impacts on the read request performance.

In this way, some embodiments of the present disclosure may implement scheduling on the received access request in a user-mode scheduling module, and preferentially distribute a preset number of read requests without distributing a writing request to improve the corresponding speed of a computing system on the read requests, and start to distribute the write request after distributing the preset number of read requests, thereby minimizing the efficiency of the write request, and achieving balanced efficiency of read and write requests.

Figure 8:
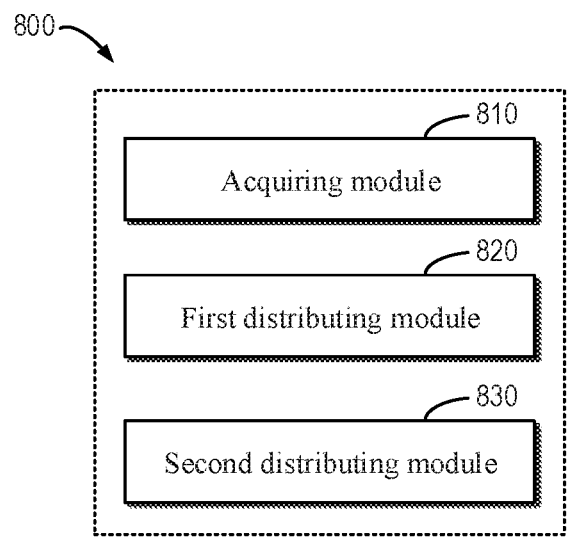
FIG. 8 shows a block diagram of an apparatus for processing an access request according to an example implementation of the present disclosure.

FIG. 8 shows a schematic block diagram of an apparatus 800 for processing an access request according to an embodiment of the present disclosure. The apparatus 800 may be included in the scheduling device 130 of FIG. 8 or be implemented as the scheduling device 130. As shown in FIG. 8, the apparatus 800 includes an acquiring module 810 configured to acquire a plurality of to-be-distributed access requests for a storage device, the access requests at least including a group of read requests and a group of write requests. Further, the apparatus 800 further includes a first distributing module 820 configured to distribute read requests of the group of read requests to a drive device of the storage device without distributing a write request of the group of write requests, until the number of distributed read requests reaches the total number of read requests of the group of read requests or a first threshold number, the drive device being configured to execute the distributed requests on the storage device. Further, the apparatus 800 further includes a second distributing module 830 configured to distribute at least one write request of the group of write requests to the drive device.

In some embodiments, the acquiring module 810 includes: a reading module configured to read a plurality of access requests from a to-be-distributed access request queue; and a grouping module configured to group the plurality of access requests into a group of read requests and a group of write requests.

In some embodiments, the drive device is implemented in a user mode.

In some embodiments, the apparatus 800 further includes: a timeout duration determining module configured to determine a timeout duration of each access request of the plurality of access requests, the timeout duration indicating a waited duration of the corresponding access request; a determining module configured to determine whether a timeout access request having a timeout duration greater than a preset time threshold is included in the plurality of access requests; and a timeout access request distributing module configured to distribute the timeout access request to the drive device.

In some embodiments, the first distributing module 820 includes: a first iterating module configured to execute following iteration for at least one time, until a counted number of read requests reaches the first threshold number: distributing a read request of the group of read requests to the drive device; and progressively increasing the counted number of read requests, the counted number of read requests indicating the number of distributed read requests; and terminating the iteration in response to no read request being undistributed in the group of read requests.

In some embodiments, the distributing a read request of the group of read requests to the drive device includes: selecting an undistributed target read request from the group of read requests, the target read request having a minimum offset for a physical address; and distributing the selected read request to the drive device.

In some embodiments, the second distributing module 830 includes: executing following iteration for at least one time, until a counted number of write requests reaches a second threshold number: distributing a write request of the group of write requests to the drive device; progressively increasing the counted number of write requests, the counted number of write requests indicating the number of distributed write requests; and terminating the iteration in response to no write request being undistributed in the group of write requests.

In some embodiments, the distributing a write request of a group of write requests to the drive device includes: selecting an undistributed target write request from the group of write requests, the target write request having a minimum offset for a physical address; and distributing the selected write request to the drive device.

Figure 9:
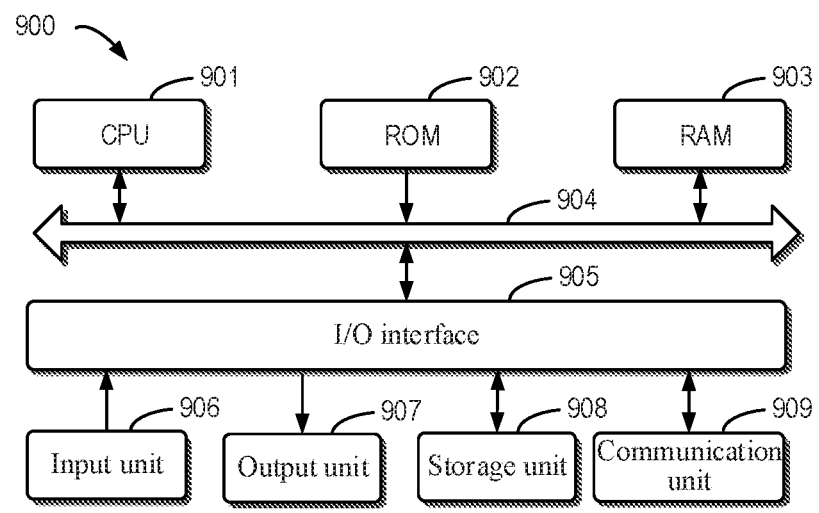
FIG. 9 shows a block diagram of a computing device capable of implementing a plurality of embodiments of the present disclosure.

FIG. 9 shows a schematic block diagram of an example device 900 that may be configured to implement some embodiments of the present disclosure. The device 900 may be configured to implement the scheduling device 130 of FIG. 1. As shown in the figure, the device 900 includes a central processing unit (CPU) 901, which may execute various appropriate actions and processes in accordance with computer program instructions stored in a read-only memory (ROM) 902 or computer program instructions loaded into a random access memory (RAM) 903 from a storage unit 908. The RAM 903 may further store various programs and data required by operations of the device 900. The CPU 901, the ROM 902, and the RAM 903 are connected to each other through a bus 904. An input/output (I/O) interface 905 is also connected to the bus 904.

A plurality of components in the device 900 is connected to the I/O interface 905, including: an input unit 906, such as a keyboard, and a mouse; an output unit 907, such as various types of displays and speakers; the storage unit 908, such as a magnetic disk, and an optical disk; and a communication unit 909, such as a network card, a modem, and a wireless communication transceiver. The communication unit 909 allows the device 900 to exchange information/data with other devices via a computer network, e.g., the Internet, and/or various telecommunication networks.

The processing unit 901 executes various methods and processes described above, such as the method 200, and/or the method 300. For example, in some embodiments, the method 200, and/or the method 300 may be implemented in a computer software program that is tangibly included in a machine readable medium, such as the storage unit 908. In some embodiments, a part or all of the computer program may be loaded and/or installed onto the device 900 via the ROM 902 and/or the communication unit 909. When the computer program is loaded into the RAM 903 and executed by the CPU 901, one or more steps of the method 200 and/or the method 300 described above may be executed. Alternatively, in other embodiments, the CPU 901 may be configured to execute the method 200, and/or the method 300 by any other appropriate approach (e.g., by means of firmware).

The functions described herein above may be performed, at least in part, by one or more hardware logic components. For example, and without limitation, exemplary types of hardware logic components that may be used include: Field Programmable Gate Array (FPGA), Application Specific Integrated Circuit (ASIC), Application Specific Standard Product (ASSP), System on Chip (SOC), Complex Programmable Logic Device (CPLD), and the like.

Program codes for implementing the method of the present disclosure may be written in any combination of one or more programming languages. These program codes may be provided to a processor or controller of a general purpose computer, special purpose computer or other programmable data processing apparatus such that the program codes, when executed by the processor or controller, enables the functions/operations specified in the flowcharts and/or block diagrams being implemented. The program codes may execute entirely on the machine, partly on the machine, as a stand-alone software package partly on the machine and partly on the remote machine, or entirely on the remote machine or server.

In the context of the present disclosure, the machine readable medium may be a tangible medium that may contain or store programs for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable combination of the foregoing.

In addition, although various operations are described in a specific order, this should not be understood that such operations are required to be performed in the specific order shown or in sequential order, or all illustrated operations should be performed to achieve the desired result. Multi-tasking and parallel processing may be advantageous in certain circumstances. Likewise, although several specific implementation details are included in the above discussion, these should not be construed as limiting the scope of the present disclosure. Certain features described in the context of separate embodiments may also be implemented in combination in a single implementation. Conversely, various features described in the context of a single implementation may also be implemented in a plurality of implementations, either individually or in any suitable sub-combination.

Although the embodiments of the present disclosure are described in language specific to structural features and/or method logic actions, it should be understood that the subject matter defined in the appended claims is not limited to the specific features or actions described above. Instead, the specific features and actions described above are merely exemplary forms of implementing the claims.

What is claimed is:

1. A method for processing an access request, comprising:
   acquiring a plurality of to-be-distributed access requests for a storage device, the access requests at least comprising a group of read requests and a group of write requests;
   a read request distribution comprising: distributing read requests of the group of read requests to a drive device of the storage device without distributing a write request of the group of write requests, until a number of distributed read requests reaches a total number of read requests of the group of read requests or a first threshold number, the drive device being configured to execute the distributed requests on the storage device; and
   a write request distribution comprising: distributing at least one write request of the group of write requests to the drive device, wherein the read request distribution or the write request distribution comprises:
   selecting an undistributed target request from a target group of requests, wherein the target group of requests is the group of read requests or the group of the write requests, and the target request has a minimum offset for a physical address in the group of target requests; and
   distributing the selected target request to the drive device.

2. The method according to claim 1, wherein the acquiring a plurality of to-be-distributed access requests comprises:
   reading the plurality of to-be-distributed access requests from a to-be-distributed access request queue; and
   grouping the plurality of access requests into the group of read requests and the group of write requests.

3. The method according to claim 1, wherein the drive device is implemented in a user state.

4. The method according to claim 1, wherein the method further comprises:
   determining a timeout duration of each access request of the plurality of to-be-distributed access requests, the timeout duration indicating a waited duration of the each corresponding access request;
   determining whether a timeout access request having a timeout duration greater than a preset time threshold is included in the plurality of to-be-distributed access requests; and
   distributing the timeout access request to the drive device.

5. The method according to claim 1, wherein the read request distribution comprises:
   executing following iteration for at least one time, until a counted number of read requests reaches the first threshold number:
   distributing a read request of the group of read requests to the drive device; and progressively increasing the counted number of read requests, the counted number of read requests indicating a number of distributed read requests; and
   terminating the iteration in response to no read request being undistributed in the group of read requests.

6. The method according to claim 1, wherein the undistributed target request is an undistributed target read request, the target group of requests is the group of read requests, and the read request distribution comprises:
   selecting the undistributed target read request from the group of read requests, the target read request having a minimum offset for a physical address in the group of read requests; and
   distributing the selected read request to the drive device.

7. The method according to claim 1, wherein the write request distribution comprises:
   executing following iteration for at least one time, until a counted number of write requests reaches a second threshold number:
   distributing a write request of the group of write requests to the drive device;
   progressively increasing the counted number of write requests, the counted number of write requests indicating a number of distributed write requests; and
   terminating the iteration in response to no write request being undistributed in the group of write requests.

8. The method according to claim 1, wherein the undistributed target request is an undistributed target write request, the target group of requests is the group of write requests, and the write request distribution comprises:
   selecting the undistributed target write request from the group of write requests, the target write request having a minimum offset for a physical address in the group of read requests; and
   distributing the selected write request to the drive device.

9. An apparatus for processing an access request, comprising:
   at least one processor; and
   a memory storing instructions, wherein the instructions when executed by the at least one processor, cause the at least one processor to perform operations, the operations comprising:
   acquiring a plurality of to-be-distributed access requests for a storage device, the access requests at least comprising a group of read requests and a group of write requests;
   a read request distribution comprising: distributing read requests of the group of read requests to a drive device of the storage device without distributing a write request of the group of write requests, until a number of distributed read requests reaches a total number of read requests of the group of read requests or a first threshold number, the drive device being configured to execute the distributed requests on the storage device; and
   a write request distribution comprising: distributing at least one write request of the group of write requests to the drive device, wherein the read request distribution or the write request distribution comprises:
   selecting an undistributed target request from a target group of requests, wherein the target group of requests is the group of read requests or the group of the write requests, and the target request has a minimum offset for a physical address in the group of target requests; and
   distributing the selected target request to the drive device.

10. The apparatus according to claim 9, wherein the acquiring a plurality of to-be-distributed access requests comprises:
    reading the plurality of to-be-distributed access requests from a to-be-distributed access request queue; and
    grouping the plurality of access requests into the group of read requests and the group of write requests.

11. The apparatus according to claim 9, wherein the drive device is implemented in a user state.

12. The apparatus according to claim 9, wherein the operations further comprise:
    determining a timeout duration of each access request of the plurality of to-be-distributed access requests, the timeout duration indicating a waited duration of the each corresponding access request;

determining whether a timeout access request having a timeout duration greater than a preset time threshold is included in the plurality of to-be-distributed access requests; and distributing the timeout access request to the drive device.

13. The apparatus according to claim 9, wherein the read request distribution comprises:

executing following iteration for at least one time, until a counted number of read requests reaches the first threshold number:

distributing a read request of the group of read requests to the drive device; and progressively increasing the counted number of read requests, the counted number of read requests indicating a number of distributed read requests; and terminating the iteration in response to no read request being undistributed in the group of read requests.

14. The apparatus according to claim 9, wherein the undistributed target request is an undistributed target read request, the target group of requests is the group of read requests, and the read request distribution comprises:

selecting the undistributed target read request from the group of read requests, the target read request having a minimum offset for a physical address in the group of read requests; and distributing the selected read request to the drive device.

15. The apparatus according to claim 9, wherein the write request distribution comprises:

executing following iteration for at least one time, until a counted number of write requests reaches a second threshold number:

distributing a write request of the group of write requests to the drive device;

progressively increasing the counted number of write requests, the counted number of write requests indicating a number of distributed write requests; and terminating the iteration in response to no write request being undistributed in the group of write requests.

16. The apparatus according to claim 9, wherein the undistributed target request is an undistributed target write, request, the target grow of requests is the group of write requests, and the write request distribution comprises:

selecting the undistributed target write request from the group of write requests, the target write request having a minimum offset for a physical address in the group of read requests; and distributing the selected write request to the drive device.

17. A non-transitory computer readable storage medium, storing a computer program thereon, wherein the program, when executed by a processor, causes the processor to perform operations, the operations comprising:

acquiring a plurality of to-be-distributed access requests for a storage device, the access requests at least comprising a group of read requests and a group of write requests;

a read request distribution comprising: distributing read requests of the group of read requests to a drive device of the storage device without distributing a write request of the group of write requests, until a number of distributed read requests reaches a total number of read requests of the group of read requests or a first threshold number, the drive device being configured to execute the distributed requests on the storage device; and a write request distribution comprising: distributing at least one write request of the group of write requests to the drive device, wherein the read request distribution or the write request distribution comprises:

selecting an undistributed target request from a target group of requests, wherein the target group of requests is the group of read requests or the group of the write requests, and the target request has a minimum offset for a physical address in the group of target requests; and distributing the selected target request to the drive device.

* * * * *

UNITED STATES PATENT AND TRADEMARK OFFICE
CERTIFICATE OF CORRECTION

PATENT NO. : 11,307,801 B2  
APPLICATION NO. : 16/707465  
DATED : April 19, 2022  
INVENTOR(S) : Lin Li et al.

Page 1 of 1

It is certified that error appears in the above-identified patent and that said Letters Patent is hereby corrected as shown below:

In the Claims

Column 14, Line 2, Claim 16, delete "write," and insert -- write --

Column 14, Line 3, Claim 16, delete "grow" and insert -- group --

Signed and Sealed this
Ninth Day of August, 2022

Katherine Kelly Vidal
*Director of the United States Patent and Trademark Office*